United States Patent [19]

Maruyama

[11] Patent Number: 4,779,926
[45] Date of Patent: Oct. 25, 1988

[54] FOLDING SEAT

[75] Inventor: Hidekazu Maruyama, Kanagawa Prefecture, Japan

[73] Assignee: Ikeda Bussan Co., Ltd., Ayase, Japan

[21] Appl. No.: 934,859

[22] Filed: Nov. 25, 1986

[30] Foreign Application Priority Data

Jan. 29, 1986 [JP] Japan .................... 61-11089[U]

[51] Int. Cl.⁴ .................................... B60N 1/02
[52] U.S. Cl. ........................ 297/324; 297/14; 297/331
[58] Field of Search ............... 297/324, 14, 331, 335, 297/336

[56] References Cited

U.S. PATENT DOCUMENTS

| 155,452 | 9/1874 | Koechling | 297/324 X |
|---|---|---|---|
| 197,723 | 12/1877 | Demarest | 297/324 X |
| 1,002,863 | 9/1911 | Packard | 297/14 X |
| 1,355,005 | 10/1920 | Schechter | 297/14 X |
| 1,778,124 | 10/1930 | Sauer | 108/132 |
| 1,887,240 | 11/1932 | Hanson | 297/331 |
| 2,258,119 | 10/1941 | Mathe et al. | 297/324 X |
| 2,492,110 | 12/1949 | Prosser et al. | 297/331 |
| 2,492,116 | 12/1949 | Roman et al. | 297/331 X |
| 2,530,625 | 11/1950 | Nordmark | 297/324 |
| 4,460,215 | 7/1984 | Chamberlain et al. | 297/324 X |
| 4,580,832 | 4/1986 | Maruyama et al. | 297/324 X |
| 4,652,051 | 3/1987 | Maruyama | 297/352 |

FOREIGN PATENT DOCUMENTS

| 860474 | 1/1941 | France | 297/324 |
|---|---|---|---|
| 945407 | 5/1949 | France | 297/324 |
| 1344393 | 10/1963 | France | 108/131 |
| 491590 | 9/1938 | United Kingdom | 297/324 |

Primary Examiner—Kenneth J. Dorner
Assistant Examiner—Laurie K. Cranmer
Attorney, Agent, or Firm—Foley & Lardner, Schwartz, Jeffery, Schwaab, Mack, Blumenthal & Evans

[57] ABSTRACT

A seat cushion is pivotally mounted on a base structure so as to be pivotal between its horizontal in-use position and its upright folded position. A roller is rotatably connected to a rear end of the seat cushion, which is operatively engaged with a curved guide rail secured to the base structure so as to run along the guide rail during the pivotal movement of the seat cushion. A roller catching device is arranged in the guide rail for catching and thus holding the seat cushion in the upright folded position when the seat cushion is pivoted to the upright folded position.

12 Claims, 3 Drawing Sheets

FOLDING SEAT

BACKGROUND OF THE INVENTION

1. Field of the Invention

The present invention relates in general to a folding seat for a motor vehicle, which is foldable when not in use, and more particularly to a folding seat which is installed in a driver's cabin of a truck or the like for use as an extra seat.

2. Description of the Prior Art

In order to clarify the task of the present invention, one of the conventional folding seats of the above-mentioned type will be outlined with reference to FIG. 5. The seat of this drawing is commonly called "jump seat" wherein the seat cushion proper is foldable when not in use.

The seat has a seat cushion 100 which is pivotally mounted on a base structure 102 secured to a floor 104 of the driver's cabin near a rear or side wall 106 of the same. The seat cushion 100 has a supporting stay 108 pivotally hanging therefrom. The lower end of the stay 108 is slidably received in a guide rail 109 secured to the base structure 102. A spring 110 biases the stay 108 toward the seat cushion 100.

When not in use, the seat cushion 100 assumes an upright folded position as illustrated by a phantom line, placing the lower end of the stay 108 at the uppermost position of the guide rail 109. Upon requirement of use, the seat cushion 100 is pulled down from the folded position and the stay 108 is pulled against the spring 110 bringing the lower end of the stay 108 into locking engagement with a given position of the guide rail 109. With this, the seat cushion 100 is held in a horizontal in-use position as illustrated by a solid line. The wall 106 located behind the seat can serve as a backrest.

However, the above-mentioned conventional folding seat has the following drawbacks due to its inherent construction.

That is, when the seat cushion 100 assumes its folded position, the lower end of the stay 108 is displaced from the given locked position of the guide rail and thus unlocked. Thus, when the vehicle moves on a rough road or the like with the seat cushion 100 folded, the stay 108 and thus seat cushion 100 are subjected to vibration producing uncomfortable noises. One method of solving this drawback is to increase the force of the spring 110. However, as is easily understood, increasing the spring force increase the force which is needed when the seat cushion 100 is pulled down for its practical use. This induces a troublesome operation of the seat and may cause the operator get hurt in the finger.

SUMMARY OF THE INVENTION

It is therefore an essential object of the present invention to provide a folding seat which is free of the above-mentioned drawbacks.

According to the present invention, there is provided a folding seat which comprises a base structure, a seat cushion pivotally mounted on the base structure so as to be pivotal between its horizontal in-use position and its upright folded position, a seat back pivotally connected to the seat cushion, a curved guide rail secured to the base structure, a roller rotatably supported by the seat cushion, the roller being operatively engaged with the guide rail so that during pivotal movement of the seat cushion relative to the base structure, the roller runs along the guide rail, a roller catching device arranged in the guide rail for catching and thus holding the seat cushion in the upright folded position when the seat cushion is pivoted to the upright folded position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following description, the terms "front", "rear", "upper", "lower" and the like are used with respect to a condition wherein the seat is in use, that is, the seat cushion is in its horizontal position and the seat back is in its upright position, as shown by the solid line in FIG. 1.

Figure 1:
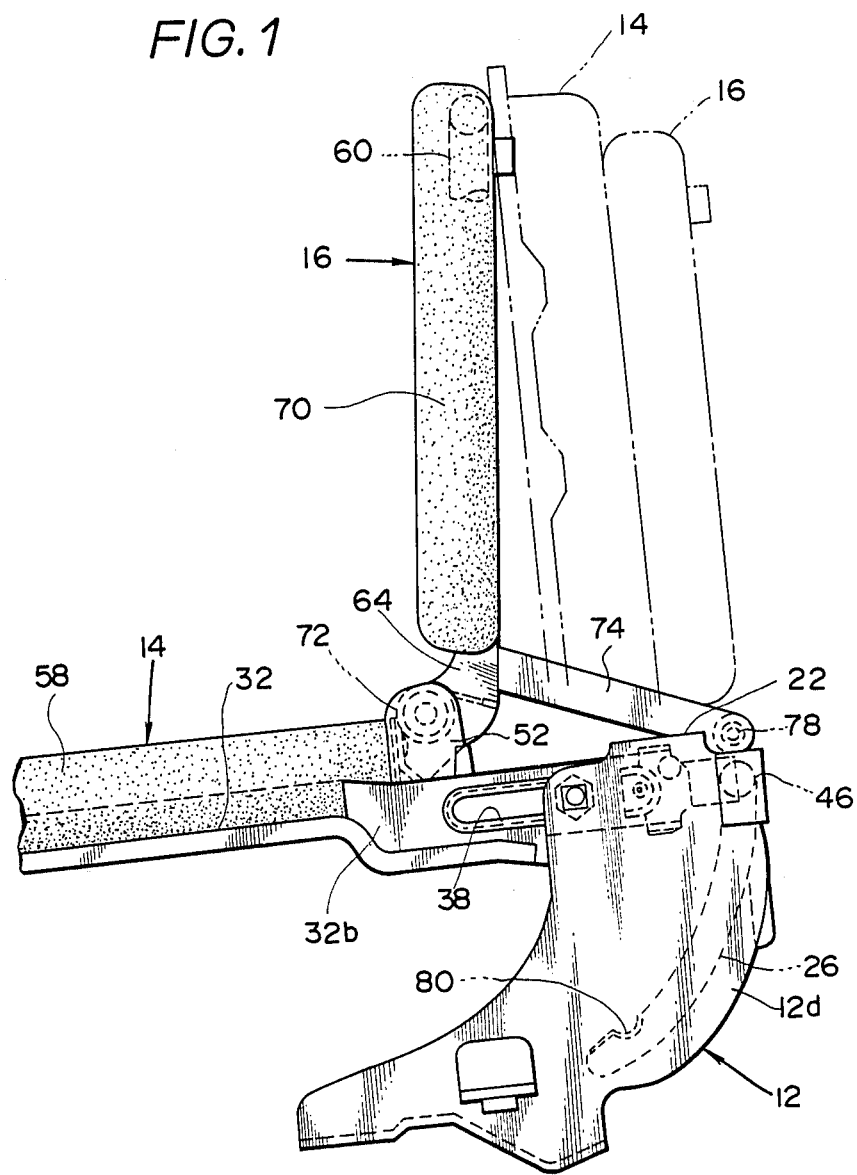
FIG. 1 is a side view of a folding seat according to the present invention.
Figure 2:
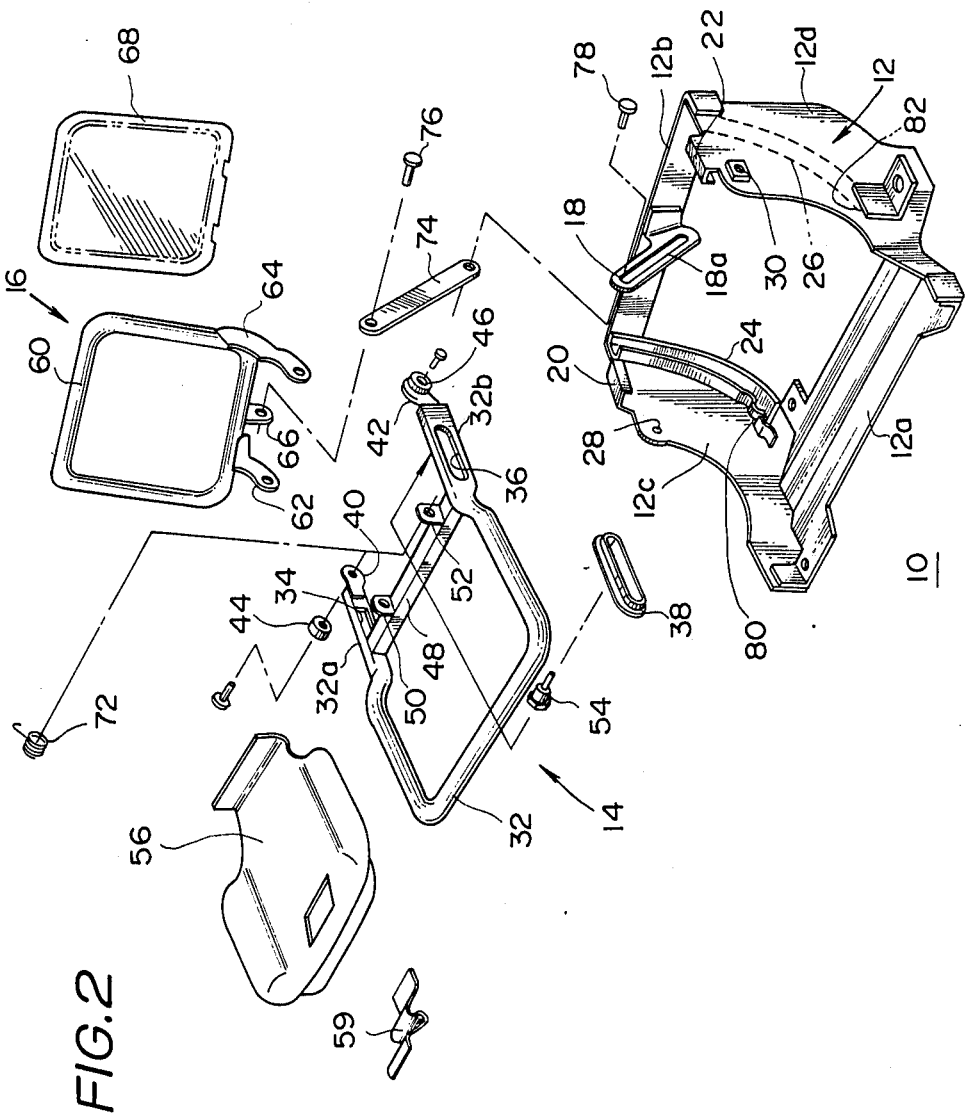
FIG. 2 is an exploded view of the folding seat of the invention.

Referring to FIGS. 1 to 4, particularly FIGS. 1 and 2, there is shown the folding seat 10 of the present invention.

The seat 10 comprises generally three major parts, that is, a base structure 12 mounted on a floor of a driver's cabin, a seat cushion 14 pivotally mounted on the base structure 12 and a seat back 16 pivotally connected to the seat cushion 14.

The base structure 12 comprises a lower beam portion 12a, an upper beam portion 12b and side wall portions 12c and 12d which are assembled to constitute a generally rectangular frame construction, as is seen from FIG. 2. The upper beam portion 12b is equipped at its inboard surface with an elongate guide bracket 18 which extends diagonally upwardly therefrom. The guide bracket 18 is formed with a longitudinally extending slot 18a. Channel-shaped stopper portions 20 and 22 are formed on the tops of the side wall portions 12c and 12d. A pair of channel-shaped curved guide rails 24 and 26 are secured to inside surfaces of the side wall portions 12c and 12d, and a pair of openings 28 and 30 are formed in the upper forward portions of the side wall portions 12c and 12d. Threaded nuts (no numerals) are secured to the side wall portions 12c and 12d in a manner to connect with the openings 28 and 30.

It is to be noted that, for the reason which will become apparent herein after, the distance between each guide rail 24 or 26 and the corresponding opening 28 or 30 increases gradually with increase of distance from the top of the guide rail 24 or 26.

The seat cushion 14 comprises a generally arch-like frame 32 which is formed at its leg portions 32a and 32b with respective elongate slots 34 and 36. Grommets 38 (only one is shown) are fitted in the elongate slots 34 and 36. The leading ends of the leg portions 32a and 32b of the frame 32 are provided with roller supporters 40 and 42 by which respective rollers 44 and 46 are rotatably supported through pins (no numerals). A beam 48 extends between the leg portions 32a and 32b of the frame 32, which is equipped with two apertured brackes 50 and 52. A pan frame 56 is mounted on the seat cushion frame 32, and a cushion pad 58 is mounted on the pan frame 56.

Mounting the seat cushion 14 to the base structure 12 is made in the following manner. That is, headed bolts 54 (only one is shown) are slidably passed through the grommets 38 of the seat cushion frame 32 and screwed into the openings 28 and 30, having the rollers 44 and 46 operatively received in the guide rails 24 and 26. With this arrangement, it will be appreciated that the seat cushion 14 can assume both its horizontal in-use position as shown in FIG. 1 wherein the leg portions 32a and 32b of the frame 32 are pressed upward against the stopper portions 20 and 22 and the rollers 44 and 46 assume their uppermost positions in the guide rails 24 and 26, and its vertical folded position wherein the leg portions 32a and 32b are positioned downwardly away from the stopper portions 20 and 22 and the rollers 44 and 46 assume their lowermost positions in the guide rails 24 and 26. Because of the non-concentric configulation of the guide rails 24 and 26 relative to the openings 28 and 30 and the provision of the elongate slots 34 and 36 of the frame 32, the tilting movement of the seat cushion 14 toward its upright folded position causes the seat cushion 14 to fall slightly into the base structure 12, as will be understood from the folded position of the seat cushion 14 illustrated by a phantom line in FIG. 1. Designated by numeral 59 (see FIG. 2) is a handle fixed to the pan frame 56 for facilitating handling of the seat cushion 14.

The seat back 16 comprises a generally rectangular frame 60 which is provided at its lower portion with two apertured pivot arms 62 and 64. An apertured small bracket 66 is fixed to the frame lower portion between the pivot arms 62 and 64. A pan frame 68 is mounted on the frame 60 and a cushion pad 70 is mounted on the pan frame 68.

Mounting the seat back 16 to the seat cushion 14 is made as follows. That is, the apertures of the pivot arms 62 and 64 are mated with the apertures of the brackets 50 and 52 of the seat cushion frame 32, and suitable pivot bolts (not shown) are passed through the mated apertures and fastened by nuts (not shown). With this, the seat back 16 is pivotal relative to the seat cushion 14. A coil spring 72 is associated with one of the pivot bolts to bias the seat back 16 away from the seat cushion 14.

In order to achieve smooth pivoting movement of the seat back 16, a link 74 is further employed, which has one end pivotally connected through a pivot pin 76 to the small bracket 66 of the seat back frame and the other end having a headed pin 78 fixed thereto. The pin 78 is slidably received in the elongate slot 18a of the guide bracket 18 of the base structure 12. Thus, during the pivoting movement of the seat back 16, the pin 78 slides in the slot 18a upward or downward.

In accordance with the present invention, the following measure is further employed in the folding seat.

As is seen from FIG. 2, each guide rail 24 or 26 is provided at its lower end portion with a roller catching device 80 or 82 which catches the corresponding roller 44 or 46 carried by the seat cushion 14 when the seat cushion 14 is pivoted to its upright folded position.

Figure 3:
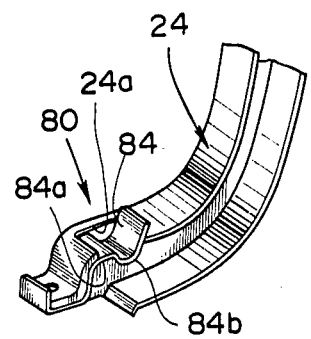
FIG. 3 is a partial perspective view of a roller guide member employed in the folding seat of the invention.
Figure 4:
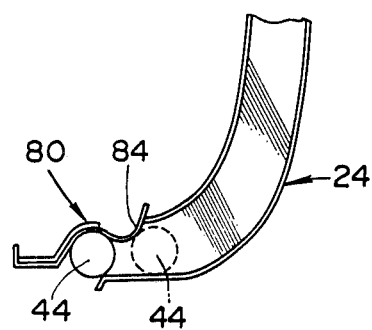
FIG. 4 is an illustration showing the relationship between the roller guide member and a roller.
Figure 5:
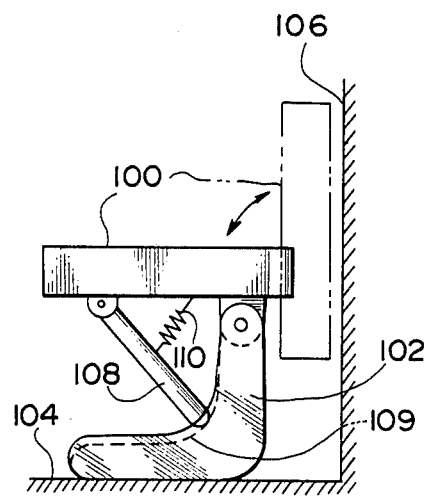
FIG. 5 is a side view of the afore-mentioned conventional folding seat.

As is best shown in FIG. 3, the roller catching device 80 (or 82) comprises a waved resilient plate 84 fixed to the guide rail 24 (or 26). That is, the waved resilient plate 84 comprises an upwardly convex portion 84a which is secured to the lower end of the guide rail 24 (or 26) and a downwardly convex portion 84b which is movably received in a cut 24a of the guide rail, projecting into the channel of the guide rail. Thus, when, as is understood from FIG. 4, the seat cushion 14 is pivoted toward its upright folded position, the roller 44 is brought into contact with the downwardly convex portion 84b of the resilient plate 84 and finally slipped into its lowermost temporally locked position, as shown by the broken line, raising the downwardly convex portion 84b upward. Under this locked position, the seat cushion 14 in the folded position is stably held by the base structure 12 without play. Of course, the seat cushion 14 can be pivoted to its horizontal in-use position when pulled down with a certain force.

As is understood from the foregoing description, the folding seat 10 of the invention is prevented from suffering the uncomfortable noise even when the associated vehicle runs.

What is claimed is:

1. A folding seat comprising:
   a base structure;
   a seat cushion pivotally mounted on said base structure so as to be pivotal between its horizontal in-use position and its upright folded position;
   a seat back pivotally connected to said seat cushion;
   a curved guide rail secured to said base structure;
   a roller rotatably connected to said seat cushion, said roller being operatively engaged with said guide rail so that during pivotal movement of said seat cushion relative to said base structure, said roller runs along the guide rail while being guided;
   roller catching means at a location along said guide rail for releasably catching said roller so as to hold said seat cushion in said upright folded position until said seat cushion is urged to pivot away from said upright folded position by a predetermined amount of force;
   an elongate guide bracket secured to said base structure, said guide bracket having a longitudinally extending slot; and
   a link having one end pivotally connected to a frame of said seat back and the other end easily engaged with said slot of the guide bracket through a pin.

2. A folding seat as claimed in claim 1, in which said roller catching device comprises a waved resilient plate which has a convex portion projecting toward said guide rail.

3. A folding seat as claimed in claim 2, in which said guide rail is in the form of a channel member, the channel-shaped guide rail having at its one side wall a cut through which said convex portion of said waved resilient plate is movably projected into the interior of the channel-shaped guide rail.

4. A folding seat as claimed in claim 3, in which said roller is rotatably supported by a supporter which is secured to a frame of said seat cushion.

5. A folding seat as claimed in claim 4, in which said base structure is formed with a stopper portion against which a portion of said seat cushion is pressed when the same assumes said horizontal in-use position.

6. A folding seat comprising:
   a base structure including two side wall portions;
   two curved guide rails secured to inside surfaces of said side wall portions of said base structure;
   a seat cushion including an arch-like frame, said frame including leg portions and longitudinally extending slots at said leg portions;

two bolts passing through the respective slots and secured to the respective side wall portions of the base structure, so that said seat cushion is pivotal relative to said base structure between its horizontal in-use position and its upright folded position;

two rollers rotatably connected to leading ends of said leg portions of the frame of said seat cushion respectively;

a seat back including a rectangular frame, said frame being pivotally connected to the frame of said seat cushion; and two roller catching devices arranged in said guide rails for catching said rollers and thus holding said seat cushion in said upright folded position when said seat cushion is pivoted to said upright folded position.

7. A folding seat as claimed in claim 6, in which each of said roller catching devices comprises a waved resilient plate which has a convex portion projecting toward the corresponding guide rail.

8. A folding seat as claimed in claim 7, in which each of said guide rails is in the form of a channel member, the channel-shaped guide rail having at its one side wall a cut through which said convex portion of the waved resilient plate is movably projected into the interior of the channel-shaped guide rail.

9. A folding seat as claimed in claim 8, in which said rollers are connected through respective supporters to the leading ends of said leg portions of the frame of said seat cushion.

10. A folding seat as claimed in claim 9, in which said frame of the seat cushion has a beam which extends between said leg portions, said beam having thereon two brackets to which two pivot arms secured to the frame of said seat back are pivotally connected through pivot pins.

11. A folding seat as claimed in claim 10, in which a spring is incorporated with one of said pivot pins to bias said seat back to pivot away from said seat cushion.

12. A folding seat as claimed in claim 11, further comprising a pivotal movement smoothing means which includes:

an elongate guide bracket secured to said base structure, said guide bracket having a longitudinally extending slot; and a link having one end pivotally connected to the frame of said seat back and the other end slidably engaged with said slot of the guide bracket through a pin.

* * * * *